United States Patent [19]

Kim et al.

[11] Patent Number: 5,375,162
[45] Date of Patent: Dec. 20, 1994

[54] METHOD OF MAKING CALL CONNECTION IN A PRIVATE BRANCH EXCHANGE SYSTEM WITH PAGING SYSTEM

[75] Inventors: Je-Woo Kim; In-Sik Cho, both of Seoul, Rep. of Korea; Hajime Gikuchi, Jindaijimoto, Japan

[73] Assignee: SamSung Electronics Co., Ltd., Kyungki-do, Rep. of Korea

[21] Appl. No.: 805,644

[22] Filed: Dec. 21, 1991

[30] Foreign Application Priority Data

Jan. 22, 1991 [KR] Rep. of Korea .................. 1991-1017

[51] Int. Cl.$^5$ ...................... H04M 11/00; H04M 3/42
[52] U.S. Cl. ........................................ 379/57; 379/56; 379/58; 379/210; 379/211; 379/212
[58] Field of Search ...................... 379/56, 57, 58, 210, 379/211, 212; 360/825.44, 825.47, 825.72

[56] References Cited

U.S. PATENT DOCUMENTS

| | | | |
|---|---|---|---|
| 4,642,425 | 2/1987 | Guinn, Jr. et al. | 379/57 |
| 4,680,785 | 7/1987 | Akiyama et al. | 379/57 |
| 4,821,308 | 4/1989 | Hashimoto | 379/57 |
| 4,882,579 | 11/1989 | Siwiak | 340/825.44 |
| 4,885,577 | 12/1989 | Nelson | 340/825.44 |
| 4,942,598 | 7/1990 | Davis | 379/211 |
| 4,947,420 | 8/1990 | Stahl et al. | 379/57 |
| 5,109,220 | 4/1992 | Breeden et al. | 379/57 |
| 5,117,449 | 5/1992 | Metroka et al. | 379/58 |
| 5,140,626 | 8/1992 | Ory et al. | 379/57 |
| 5,148,473 | 9/1992 | Freeland et al. | 379/57 |
| 5,151,930 | 9/1992 | Hagl | 379/57 |
| 5,175,758 | 12/1992 | Levanto et al. | 379/57 |

*Primary Examiner*—Stephen Chin
*Assistant Examiner*—Vijay Shankar
*Attorney, Agent, or Firm*—Robert E. Bushnell

[57] ABSTRACT

A method of making the connection of a call in a private exchange to connect a call directly and promptly with a respective subscriber regardless of whether the called subscriber extension is absent from or present at the vicinity of an extension line (telephone), and for reducing the operating cost and increasing the efficiency of an extension line by coping with a loss of an existing call and a time consuming connection of a call, and utilizing a pager system. This disclosed method for connects a private exchange with a private pager system and connect a call according to a certain response after sending a radio paging to a respective pager corresponding to a specific number of extension the called subscriber.

8 Claims, 3 Drawing Sheets

METHOD OF MAKING CALL CONNECTION IN A PRIVATE BRANCH EXCHANGE SYSTEM WITH PAGING SYSTEM

BACKGROUND OF THE INVENTION

The present invention relates to a method of making a call connection in a private branch exchange system, and more specifically a call with whether the certain extension subscriber by utilizing a private pager system especially, in the case of a party line used by a plurality of subscribers.

Generally, a private branch exchange(PBX) system receives an incoming call from a central office line (C.O. line) or an extension line, and transmits an outgoing call to the C.O. line and the extension line.

In the case of one party line (one telephone) being used by a plurality of subscribers, when the incoming call from the C.O line or the extension line is received at the telephone used by a desired called person by switching of the PBX system, it is unable to distinguish a right called person for a call and accordingly someone has to advise the called person of the call by doing a hook-off to connect a communication path between a caller and the called person. Accordingly in a case of a subscriber being absent, a communication becomes impossible. Therefore it is necessary to consider another method for securing a rapid connection of the call and preventing the loss of the call.

Figure 1:
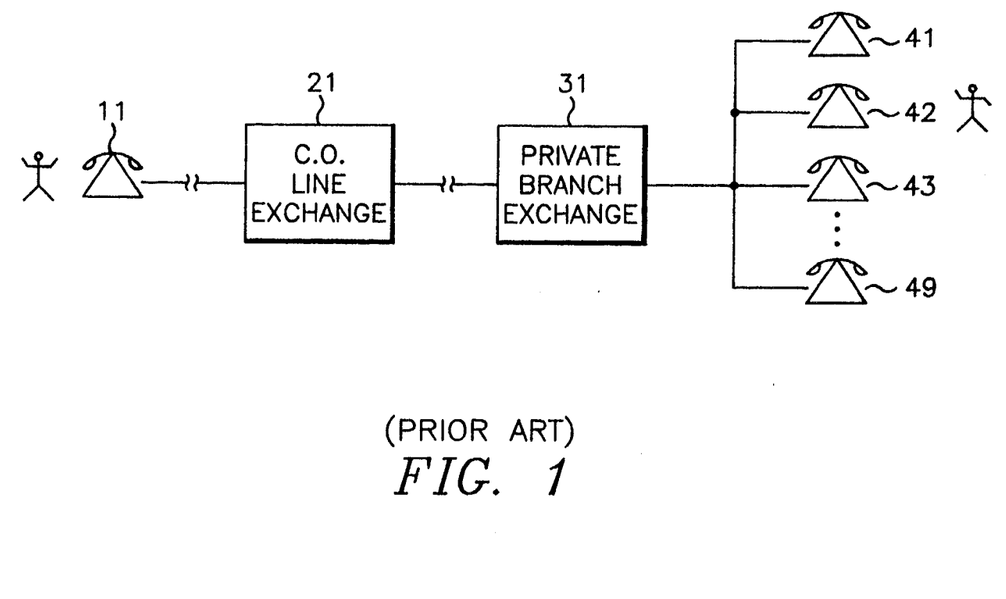
FIG. 1 shows a block diagram of the conventional system.

With reference to FIG. 1, a conventional connection method of the call will be described as follows.

In a conventional configuration in FIG. 1, a call generated from a C.O. line subscriber 11 is transmitted to a PBX system 31 through a C.O. line exchange system 21. The PBX system 31 transmits a ring signal to a telephone of the desired called extension party from among a plurality of telephones 41 to 49 connected to the PBX system 31, through an extension line connected to the telephone selected by the C.O. line subscriber 11. At this time, in the case that the telephone of the called extension party is being a reference numeral 41, for example, the C.O. line subscriber 11 is able to communicate with an extension subscriber of the telephone 41 when the extension subscriber hooks off the telephone 41.

Similarly, a communication between the extension subscribers is performed in such a way. When an extension subscriber 49 calls the another extension subscriber 41, by hook-off of the extension subscriber telephone 41, a call of the extension subscriber 49 is connected to the extension subscriber 41 through the PBX system 31.

However, in the case that one telephone is used by a plurality of extension subscribers, it takes times to perform a call connection between a called party and a calling party and it is troublesome to distinguish the called party from the other extension subscribers using the same telephone. Therefore the call is lost, especially when the called party is absent nearby.

To prevent a loss of the call and to cope with such troublesome, there is introduced an improved conventional method of connecting the call, such as a utilizing a pager system. The pager system includes a method of display pager and a method of mimic.

In the method of display pager, an absent subscriber not only experiences a complicated procedure to transmit a return call signal after confirming a number of the calling party displayed on the pager, but also experience a loss of the call made by the calling party and, accordingly, it is impossible to perform a communication in the case of the calling party using an exclusive line of transmission such as a public telephone set.

As compared favorably with the display pager, it is convenient for a subscriber (called party) to perform a communication by putting his extension number into any one of a plurality of extension subscriber telephones in the method of the mimic even if he is absent from his designated location. But in the case that one telephone is owned by a plurality of subscribers, it is difficult to connect a call with the called party, regardless of the called subscriber's presence or absence at the designated location. That is, because it is impossible to discriminate a right called subscriber for the call when a call signal is received in such a case, the call connection between two respective subscribers is possible only after someone hooks off the telephone of the called subscriber.

SUMMARY OF THE INVENTION

The object of this invention is to provide a call connection method for connecting a call directly and promptly with a respective subscriber regardless of the called subscriber's absence from or presence at the vicinity of an extension line (telephone) corresponding to the called subscriber, by using a pager system, in the case that one telephone is owned by a plurality of extension subscribers in order to overcome the above mentioned problems.

The other object of this invention is to provide a call connection method in a private branch exchange system utilizing a pager system, in order to reduce the operating cost and increase the efficiency of an extension telephone, by using one telephone owned by a plurality of subscribers.

In accordance with the present invention, there is provided a method for connecting a PBX system with a private pager system and connecting a call according to a certain response after sending a radio paging to a respective pager with a specific number allocated to each extension line subscriber.

BRIEF DESCRIPTION OF THE DRAWINGS

These and other features of the invention will be understood from the following description of the illustrative embodiments, with reference to the drawings, in which.

DETAILED DESCRIPTION OF THE PREFERRED EMBODIMENT

Figure 2:
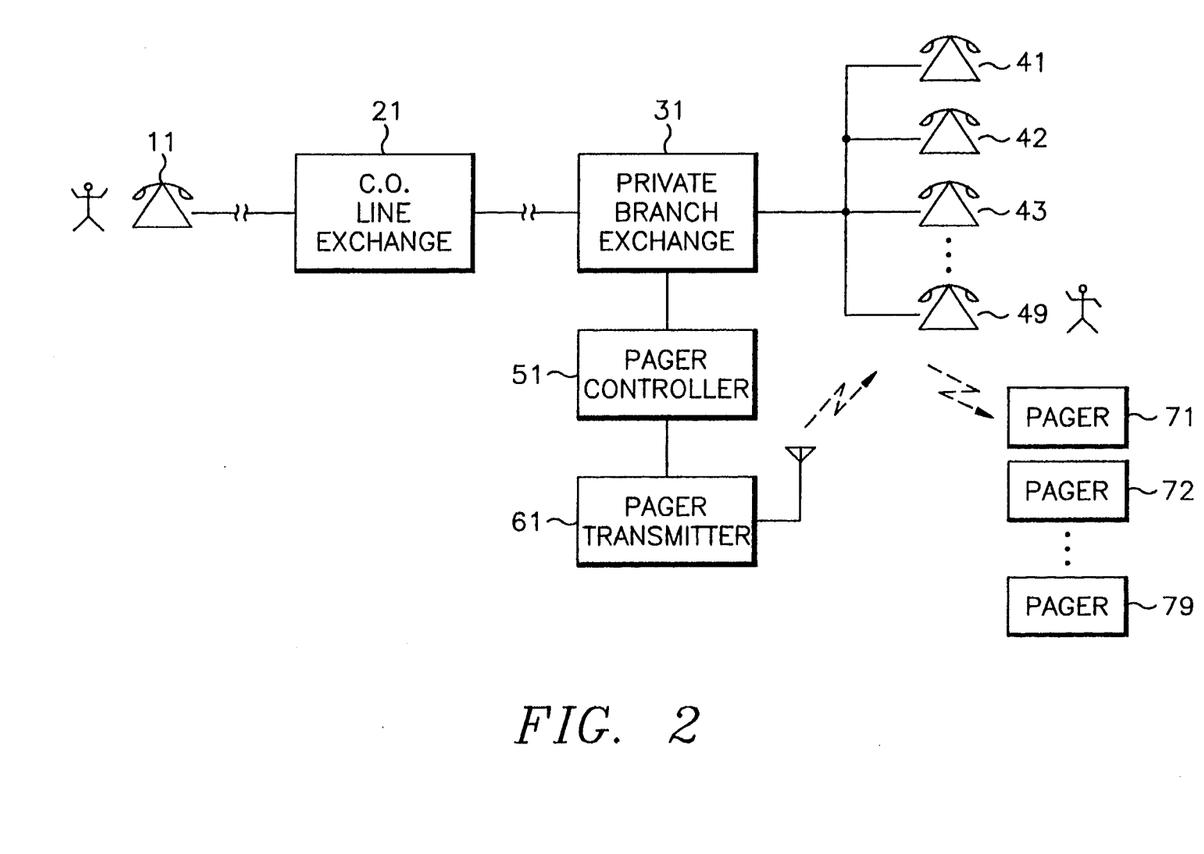
FIG. 2 shows a block diagram according to the present invention.

With reference to FIG. 2, a configuration of this inventive system comprises a C.O. line exchange system 21 connected with a C.O. line subscriber telephone 11, a PBX exchange system 31 having a plurality of extension subscriber telephones 41 to 49, for connecting a communication between the C.O line subscriber of the C.O. line exchange system 21 and the extension subscribers of the PBX system 31, or between the extension subscribers themselves, a pager controller 51 connected with the PBX system 31, for controlling a paging signal corresponding to the extension subscriber's specific number, and a pager transmitter 61 for transmitting the paging signal to a respective pager of a plurality of pagers 71 to 79 based on the control of the pager controller 51.

Figure 3:
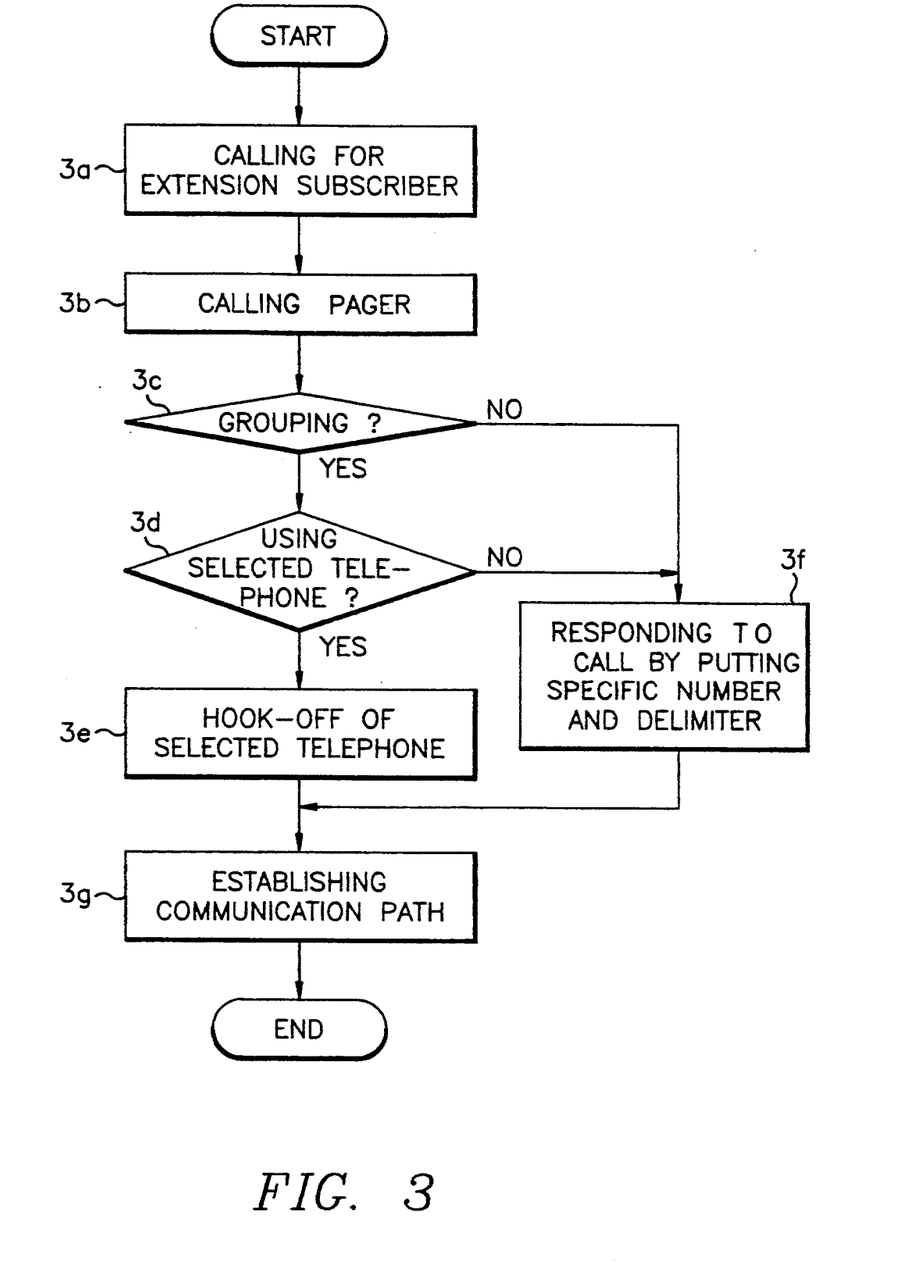
FIG. 3 is a flow chart for illustrating the control of the inventive system.

FIG. 3 is a control flow diagram of a preferred embodiment according to the present invention, which includes steps as follows:

Steps 3a and 3b: when an incoming call requiring a given extension subscriber is transmitted to the PBX system, calling a pager corresponding to the extension subscriber's specific number by radio paging, the incoming call being generated from the O.C. line telephone of the O.C. line exchange system or another extension subscriber telephone of the PBX system;

Step 3c: checking whether a plurality of pagers are grouped with one of a plurality of extension subscriber telephones;

Steps 3d and 3e: if a plurality of pagers are grouped in the step 3c, the given extension subscriber hooks off the extension subscriber telephone in which the extension subscriber's specific number is place, so that a communication path between a called extension subscriber and the calling party of the incoming call is established; and Step 3f: if the extension subscriber is absent from the designated location thereof and a plurality of pagers are grouped, or if a plurality of pagers are not grouped, the extension subscriber puts a specific number thereof and a delimiter indicating a response to the incoming call, so that a communication path between the called extension subscriber and the calling party of the incoming call is established. The called subscriber recognizes a call signal requiring his response not by a ring signal of telephone but by a pager signal principally.

An example of an embodiment will be described with reference to FIG. 2 and 3.

Firstly, a specific number is allocated to each extension subscriber, the total number of extension subscriber being more than the number of extension subscriber telephones 41 to 49, and a pager corresponding to each respective specific number is allocated to each of the extension subscribers. In other words, every extension subscriber has his own specific number and a plurality of extension subscribers use a certain extension subscriber telephone in common.

There are two methods for utilizing the pager and the extension subscriber telephone, one of which is to let a plurality of subscribers use one extension subscriber telephone exclusively, by grouping the extension subscribers, and the other method is to let all subscribers share use of all extension subscriber telephones without grouping.

For example if the extension subscriber telephone number of the PBX system 31 is xxx-####, the xxx is the direct in dialing (DID) central office exchange number and the #### is the specific number of each extension subscriber.

Assuming that the specific number of a pager 79 is 0003, the PBX system 31 transmits the called number 0003 to the pager controller 51 if an incoming call requiring an extension subscriber having the specific number 0003 is transmitted from an O.C. line exchange system 21 or the extension subscriber 41 to the PBX system 31.

The pager controller 51 calls the pager 79 corresponding to the number 0003 through the pager transmitter 61 by radio paging. Because the PBX system 31 holds the radio page call for a certain amount of time, a ring signal of the extension subscriber's telephone is not provided.

In the case of mapping a group of pagers 71 to 79 on an extension subscriber telephone 49, the holder of the pager 79 hooks off the telephone 49 (assuming that an extension subscriber telephone 49 has the number 0003) and the PBX system 31 connects the communication path between the extension subscriber telephone 49 and the C.O. line exchange 21 or the extension subscriber 41. However, when the extension subscriber 49 is absent from his designated location, the PBX system 31 establishes the communication path by analyzing the specific number and the delimiter indicating a response to the incoming call, which are put into any selected telephone by the absent subscriber 49.

On the other hand, in the case of not mapping a group of pagers 71 to 79 on the extension subscriber telephone 49, if the called extension subscriber puts the specific number thereof and a delimiter in response to the incoming call into any extension subscriber telephone, the PBX system 31 connects the communication path between the called extension subscriber and the C.O. line exchange system 21 or the extension subscriber 41. As a result, a communication is performed between the calling party and the called party.

The pager controller 51 and the pager transmitter 61 are corresponding to a pager system, such radio paging method being known widely as a prior art.

Referring to FIG. 3, the pager corresponding to the extension subscriber's specific number is called by a radio paging, if a call requiring the extension subscriber, which is generated from the O.C. line exchange system or another extension subscriber of the PBX system, is received, in steps 3a and 3b.

A steps 3c to 3g show that a respective extension subscriber responds to the call. Steps 3c to 3e show that a group of subscribers uses exclusively one channel, and a step 3f shows the procedure responding to the call, in case of a called subscriber being absent from his designated location even in case of being grouped, and in case of not being grouped.

Steps 3c to 3e show that when the called subscriber responds to a call for the called subscriber by hooking off a designated telephone, the private exchange 31 establishes a communication path between the calling and the called parties by recognizing the hook-off of the designated telephone. The step 3f shows that when the extension subscriber puts his own specific number and a delimiter responding to a call for the called into any telephone of a plurality of extension subscriber telephones, the PBX system 31 establishes a communication path between the called subscriber and the O.C. line exchange system or another extension subscriber of the PBX system.

The above mentioned grouping is made by a grouping function of the private exchange.

As described, this system allows a plurality of subscribers to use one telephone in common as a party line and to connect a communication path promptly and directly regardless of absence or presence of a called subscriber from and at a designated location and without confirming the called subscriber.

While the invention has been particularly shown and described with reference to the preferred specific embodiment thereof, it will be apparent to those who skilled in the art that in the foregoing changes in form and detail may be made without departing from the spirit and scope of the present invention.

What is claimed is:

1. A method of making a call to a given subscriber in a private branch exchange system having a plurality of extension subscriber telephones for corresponding extension subscribers and a pager system, said pager system associated with a plurality of attendant paging receivers, each paging receiver having a given subscriber number to identify a respective subscriber, said method comprising the steps of:

enabling said paging system to simultaneously transmit a calling signal to a given subscriber via a corresponding extension subscriber telephone and a paging signal to a paging receiver having the corresponding extension subscriber telephone, respectively; and checking whether said plurality of extension subscriber telephones are grouped together for allowing the corresponding extension subscribers to use only one designated extension subscriber telephone exclusively;

checking whether said given subscriber is absent from said designated extension telephone for enabling connection of a communication path in the private branch exchange system between said given subscriber and a calling party of said incoming call when said given subscriber picks up said designated extension telephone, if said plurality of extension subscriber telephones are grouped together; and enabling connection of a communication path between said given subscriber and said calling party when said given subscriber picks up any extension subscriber telephone from said plurality of extension subscriber telephones and enters said given subscriber number and a delimiter indicative of a responding call signal, if said plurality of extension subscriber telephones are not grouped together or said given subscriber is absent from said designated extension subscriber telephone.

2. A method of making a call to a given subscriber in a private branch exchange system having a plurality of extension subscriber telephones and a pager system, said pager system associated with a plurality of attendant paging receivers, each paging receiver having a given subscriber number to identify a respective subscriber, said method comprising the steps of:

enabling said paging system to transmit a calling signal to the paging receiver, said calling signal including a subscriber number information associated with the subscriber, in response to an incoming call to the subscriber;

connecting a communication path in the private branch exchange system between said subscriber and a calling party of said incoming call when a designated extension subscriber telephone of said plurality of extension subscriber telephones is hooked off, wherein said said plurality of extension subscriber telephones are grouped with an extension line connected to the telephone of said subscriber; and connecting a communication path in the private branch exchange system between said subscriber and said calling party of said incoming call when said subscriber picks up any extension subscriber telephone from said plurality of extension subscriber telephones and dials said given subscriber number and a delimiter indicative of a responding call signal, if said plurality of extension subscriber telephones are not grouped together or said given subscriber is absent from said designated extension subscriber telephone.

3. A method of completing a call to a called extension line subscriber by using a private branch exchange system having a plurality of extension subscriber telephones, and a pager system having a plurality of paging receivers, each paging receiver having a subscriber number corresponding to each of a plurality of extension line subscriber, said method comprising:

receiving a call from one of a central office line and an extension line;

transmitting a call signal to one of said plurality of paging receivers having the subscriber number corresponding to said called extension line subscriber;

establishing a communication path between a caller and said called extension line subscriber when said called extension line subscriber removes a hook-off of an extension subscriber telephone corresponding to said called extension line subscriber;

determining whether said plurality of extension line subscribers are only to use one said extension line telephones by grouping said plurality of extension line subscribers or whether all subscribers may use any of said plurality of extension line telephones;

determining whether said called extension line subscriber has removed said hook-off of said extension subscriber telephone corresponding to said extension line subscriber if said plurality of extension line subscribes are grouped together;

determining whether said called extension line subscriber has entered said subscriber number and a delimiter indicative of a responding call signal into one of said plurality of extension line telephones if said plurality of extension line subscribers are not grouped together;

determining whether said called extension line subscriber has entered said subscriber number and said delimiter into one said plurality of extension line telephones if said plurality of extension line subscribers are grouped together and said called extension line subscriber does not remove said hook-off from said extension subscriber telephone corresponding to said called extension line subscriber;

establishing a communication path between said caller and said called extension line subscriber if said called extension line subscriber has entered said subscriber number and said delimiter into one of said plurality of extension line telephones and said plurality of extension line subscribers are not grouped together; and establishing a communication path between said caller and said called extension line subscriber if said called extension line subscriber has entered said number and said delimiter into one of said plurality of extension line telephones, said plurality of extension line subscribers are grouped together, and said called extension line subscriber does not remove said hook-off from said extension subscriber telephone corresponding to said called extension line subscriber.

4. A telephone system for establishing a connection between telephones, comprising:

a private branch exchange network having a central office telephone connected to a central office line and a plurality of extension telephones respectively connected to a plurality of extension lines, said central office telephone and each of said plurality of extension telephones having a respective given subscriber number;

means for enabling said private branch exchange network to transmit a telephone call from a first subscriber of a first telephone connected to one of said central office line and a first one of said plurality of extension lines to a second subscriber of a second telephone connected to a second one of said plurality of extension lines;

a paging network, connected to said private branch exchange network, having a plurality of pagers, each of said pagers being identifiable by the subscriber number of the respective extension telephone;

means for enabling said paging network to transmit paging messages indicative of said telephone call, when said telephone call has been transmitted by said first subscriber, to a designated pager identifiable by the subscriber number of said second telephone to alert said second subscriber of said telephone call; and means for enabling connection between said first telephone of said first subscriber and said second telephone of said second subscriber, within said private branch exchange network, when said second subscriber is present and picks up said second telephone if said second telephone is an exclusive telephone and if said plurality of extension telephones are grouped together, or when said second subscriber is absent from said second telephone but responds to said telephone call by picking up any extension telephone within said plurality of extension telephones and entering his subscriber number and a delimiter indicative of a response to said telephone call if said plurality of extension telephones are not grouped together.

5. A method for establishing a connection between telephones in a private branch exchange network having a central office telephone connected to a central office line and a plurality of extension telephones respectively connected to a plurality of extension lines, said central office telephone and each of said plurality of extension telephones having a given subscriber number, said method comprising the steps of:

receiving a telephone call from a first subscriber from a first telephone connected to one of said central office line and a first one of said plurality of extension lines to enable transmission of said telephone call to a second subscriber of a second telephone connected to a second one of said plurality of extension lines;

transmitting paging messages indicative of said telephone call, when said telephone call has been received from said first subscriber, to a designated pager identifiable by a subscriber number of said second telephone to alert said second subscriber of said telephone call; and establishing the connection between said first telephone of said first subscriber and said second telephone of said second subscriber, within said private branch exchange network, when said second subscriber is present and removes a hook-off of said second telephone if said second telephone is an exclusive telephone and said plurality of extension telephones are grouped together, or when said second subscriber is absent from said second telephone but responds to said telephone call by picking up any extension telephone within said plurality of extension telephones and entering the subscriber number of said second telephone and a delimiter indicative of a response to said telephone call if said plurality of extension telephones are not grouped together.

6. A telephone system for establishing a connection between telephones using a pager, comprising:

a private branch exchange network having a central office telephone connected to a central office line and a plurality of extension telephones respectively connected to a plurality of extension lines, said central office telephone and each of said plurality of extension telephones having a respective given subscriber number;

means for enabling said private branch exchange network to transmit a telephone call from a first subscriber of a first telephone connected to one of said central office line and a first one of said plurality of extension lines, to a second subscriber of a second telephone connected to a second one of said plurality of extension lines; and a paging network, communicably connected to said private branch exchange network, for enabling transmission of paging messages indicative of said telephone call, when the telephone call has been transmitted by said first subscriber, to a designated pager identifiable by the subscriber number of said second telephone to alert said second subscriber to said telephone call, and for establishing communication between said first telephone of said first subscriber and said second telephone of said second subscriber, within said private branch exchange network, when said second subscriber is present and picks up said second phone if said second telephone is an exclusive telephone and said plurality of extension telephones is grouped together, or when said second subscriber is absent from said second telephone but responds to said telephone call by picking up any extension telephone within said plurality of extension telephones and entering the subscriber number of said second telephone and a delimiter indicative of a response to said telephone call if said plurality of extension telephones are not grouped together.

7. The telephone system as claimed in claim 6, wherein said paging network comprises:

a plurality of pagers, each of said pagers being identifiable by the subscriber number of the respective extension telephone and separable from each other;

paging controller means for controlling transmission of the paging messages indicative of each telephone call from said first subscriber of the first telephone to the designated pager of said plurality of pagers identifiable by the subscriber number of the second telephone; and paging transmitter means for transmitting the paging messages to the designated pager of said plurality of pagers.

8. The telephone system as claimed in claim 7, wherein each of said plurality of pagers is placed within a communication range from said paging network.

* * * * *

UNITED STATES PATENT AND TRADEMARK OFFICE
CERTIFICATE OF CORRECTION

PATENT NO. : 5,375,162
DATED : December 20, 1994
INVENTOR(S) : Je-Woo KIM, et al.

It is certified that error appears in the above-indentified patent and that said Letters Patent is hereby corrected as shown below:

TITLE PAGE

Item [22]        change "Dec. 21, 1991" to --Dec. 12, 1991--;

IN THE ABSTRACT

| | | |
|---|---|---|
| Item [57] | line 3 | after "called", insert --extension--; |
| | line 4 | after "subscriber", delete "extension--; |
| | line 9 | after "method", delete "for"; |
| | line 11 | before "a call", change "connect" to --connects--; |
| | line 13 | before "extension", insert --the called--; |
| | | before "subscriber", delete "the called"; |

UNITED STATES PATENT AND TRADEMARK OFFICE
CERTIFICATE OF CORRECTION

PATENT NO. : 5,375,162
DATED : December 20, 1994
INVENTOR(S) : Je-Woo KIM, et al.

It is certified that error appears in the above-indentified patent and that said Letters Patent is hereby corrected as shown below:

| | | |
|---|---|---|
| Column 1, | line 9, | after "specifically", insert --, for connecting--; |
| | | before "certain", change "whether the" to -- a --; |
| | line 10 | before "subscriber", delete "extension"; |
| | | after "system", insert a comma; |
| | line 41 | after "party is", delete "being"; |
| | line 48 | before "another", delete "the"; |
| | line 60 | before "there is", change "troublesome, " to --troubles,--; |
| Column 3 | line 12 | before "line", change "O.C." to --C.O.--; |
| | line 13 | before "line", change "O.C." to --C.O.--; |

UNITED STATES PATENT AND TRADEMARK OFFICE
CERTIFICATE OF CORRECTION

| | | |
|---|---|---|
| PATENT NO. : | 5,375,162 | |
| DATED : | December 20, 1994 | |
| INVENTOR(S) : | Je-Woo KIM, et al. | |

It is certified that error appears in the above-indentified patent and that said Letters Patent is hereby corrected as shown below:

| | | |
|---|---|---|
| | line 33 | after "tele-phone", insert a comma; |
| | line 37 | after "number of extension", change "subscriber" to --subscribers--; |
| | line 52 | after "For example", insert a comma; |
| | line 61 | before "line", change "O.C." to --C.O.--; |
| Column 4 | line 19 | before "delimiter", change "a" to --the--; |
| | line 32 | before "line", change "O.C." to --C.O.--; |
| | line 35 | before "steps", delete "A"; |
| | line 44 | after "private", insert --branch--; |
| | line 49 | after "for the called", insert --subscriber--; |

UNITED STATES PATENT AND TRADEMARK OFFICE
CERTIFICATE OF CORRECTION

PATENT NO. : 5,375,162
DATED : December 20, 1994
INVENTOR(S) : Je-Woo KIM, et al.

It is certified that error appears in the above-indentified patent and that said Letters Patent is hereby corrected as shown below:

| | | |
|---|---|---|
| Column 6 | line 10 | after "extension line", change "subscriber" to --subscribers--; |
| | line 29 | after "to said", insert --called--; |
| | line 31 | before "are grouped", change "subscribes" to --subscribers--; |
| | line 40 | after "into one", insert --of--; |
| | line 55 | after "entered said", insert --subscriber--; |

Signed and Sealed this

Third Day of September, 1996

Attest:

BRUCE LEHMAN

Attesting Officer          Commissioner of Patents and Trademarks